(12) United States Patent
Madsen

(10) Patent No.: US 8,200,399 B2
(45) Date of Patent: Jun. 12, 2012

(54) METHOD OF CONTROLLING A BALER AND A BALER

(75) Inventor: Tommy Ertbolle Madsen, Virum (DK)

(73) Assignee: Agrocom Verwaltungs GmbH, Bielefeld (DE)

( * ) Notice: Subject to any disclaimer, the term of this patent is extended or adjusted under 35 U.S.C. 154(b) by 849 days.

(21) Appl. No.: 12/066,905

(22) PCT Filed: Sep. 12, 2006

(86) PCT No.: PCT/DK2006/050041
§ 371 (c)(1),
(2), (4) Date: Sep. 15, 2008

(87) PCT Pub. No.: WO2007/031093
PCT Pub. Date: Mar. 22, 2007

(65) Prior Publication Data
US 2010/0063690 A1    Mar. 11, 2010

(30) Foreign Application Priority Data
Sep. 14, 2005    (DK) ................................ 2005 01284

(51) Int. Cl.
*A01D 41/14*    (2006.01)
*G06F 7/70*    (2006.01)
*G06F 19/00*    (2006.01)
*G06G 7/00*    (2006.01)
*G06G 7/76*    (2006.01)

(52) U.S. Cl. ................ 701/50; 56/10.2 R; 56/10.2 A; 56/10.8; 56/432; 56/DIG. 2; 56/DIG. 15

(58) Field of Classification Search .............. 701/50, 701/23, 200, 207, 208, 213; 700/95, 209, 700/245, 275; 56/341–343, 10.2 R, 10.1, 56/10.2 A, 10.2 C–10.2 J, 10.5, 10.8, 13.5–17.6, 56/432–465, 131–217, DIG. 2, DIG. 7, DIG. 15; 100/88, 89, 99
See application file for complete search history.

(56) References Cited

U.S. PATENT DOCUMENTS

| 4,850,271 A | 7/1989 | White et al. |
| 6,336,051 B1 | 1/2002 | Pangels et al. |
| 2005/0102079 A1 | 5/2005 | Hofer et al. |

FOREIGN PATENT DOCUMENTS

| DE | 3811649 C1 | 6/1989 |
| DE | 102005005556 A1 | 8/2006 |
| EP | 0121597 A2 | 10/1987 |
| EP | 0257614 A1 | 3/1988 |
| EP | 1685759 A1 | 8/2006 |

*Primary Examiner* — Christopher J. Novosad
(74) *Attorney, Agent, or Firm* — Browdy and Neimark, PLLC

(57) ABSTRACT

A baler (1) composed of a pick-up device (4) for picking up a crop string (12), a compression device for compressing the crop in a compression direction to form a bale, the compression device having components (19) for measuring a distribution of a charging degree transversely to the compression direction. The baler (1) also has a 3D imaging device (11) for recording a 3D image (23) of the field and the crop string (12) in front of the baler (1), and a control device including a data processor (13) for controlling the baler (1) in dependence on data from the 3D image (23) and the charging degree (25).

8 Claims, 3 Drawing Sheets

Figure 1A:
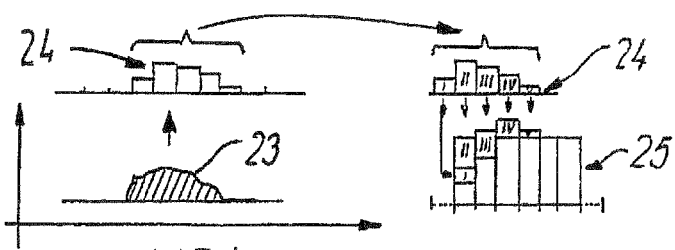

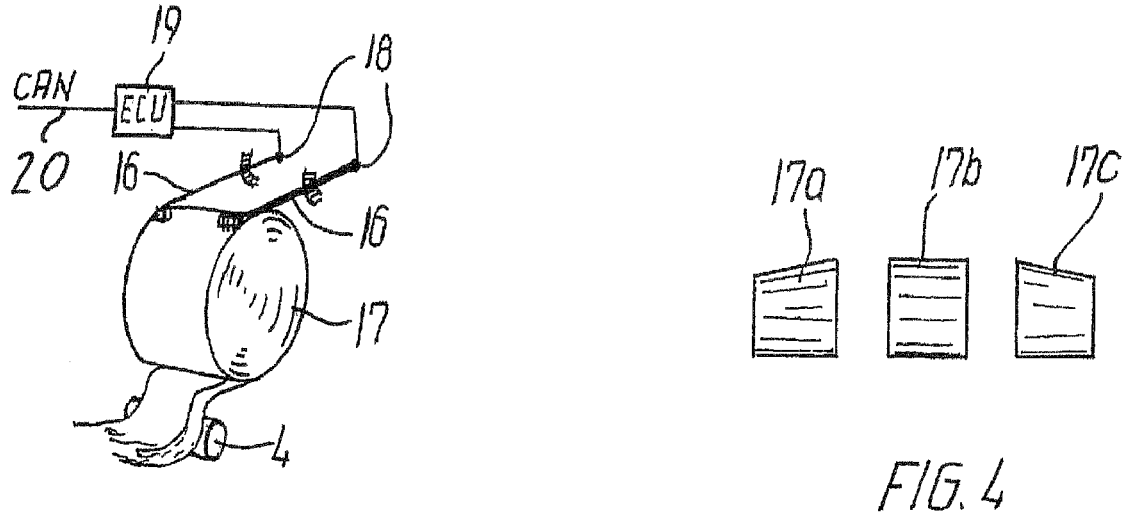
FIG. 3
FIG. 4
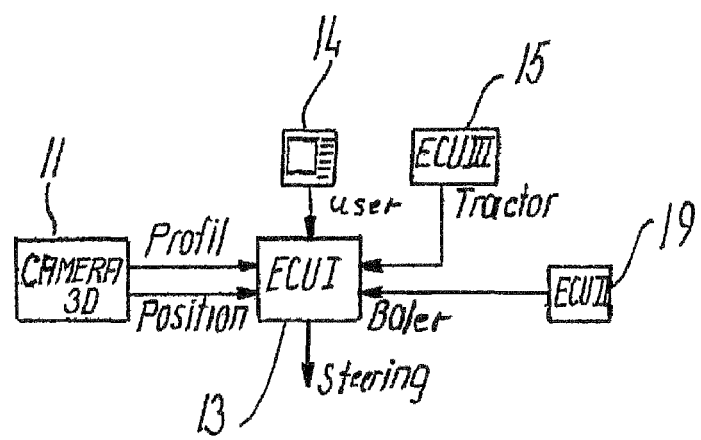
FIG. 5

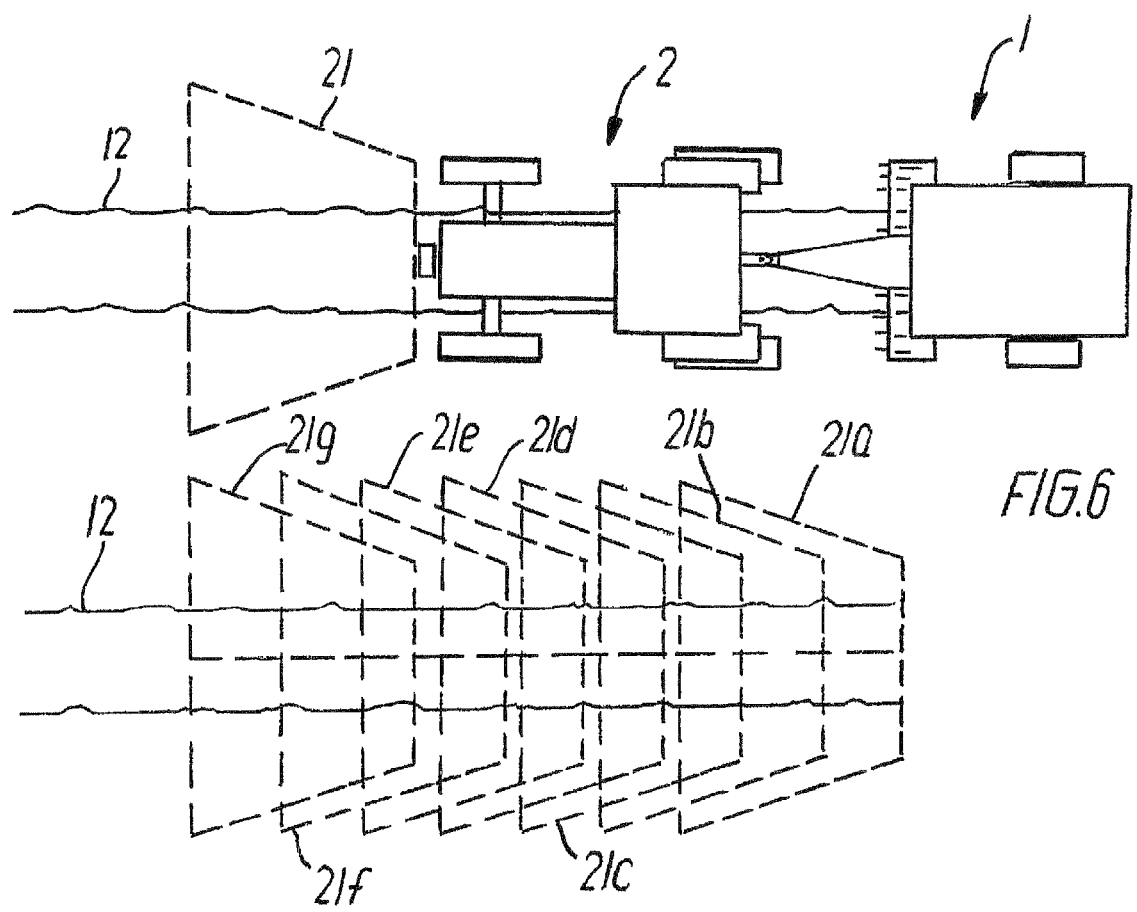

METHOD OF CONTROLLING A BALER AND A BALER

The present invention relates to a method of controlling a baler during the picking up of a crop string, the baler comprising a pick-up device which picks up the crop, whereupon the crop is passed to a compression device which compresses the crop in a compression direction to form a bale, the compression device comprising means for measuring a distribution of a charging degree transversely to the compression direction.

The present invention further relates to a baler comprising a pick-up device for picking up a crop string, a compression device for compressing the crop in a compression direction to form a bale, the compression device comprising means for measuring a distribution of a charging degree transversely to the compression direction.

A method and a baler of the above type is described in EP 257 614, which describes a baler for compressing large rectangular, or rather box-shaped bales of hay, straw or other crop. This prior-art baler comprises a device with a reciprocating compression plunger for compressing the crop into a bale. The plunger is driven by two arms, and there are sensors to monitor whether these arms are loaded evenly or unevenly, the latter being a sign of uneven charging of the baling chamber, which will lead to non-uniform bales, which is undesired. Registration of uneven loading results in a signal via a microcomputer to the operator of the baler to perform a steering correction relative to the crop string. This signal will be an aid in achieving a bale of even charging, but at the same time the signal will be a further input to which the tractor operator must relate, and the signal will thus be a stress factor.

DE 38 11 649 describes a method of uniform loading of a baler, the crop string being detected mechanically by means of fingers hanging down in front of the pick-up device of the baler. Based on the detection, the pick-up device or the crop string is controlled to achieve central picking up relative to the baler. This method of mechanical detection is stated to be an alternative to the method according to the publication above, EP 257 614, which is stated to have the disadvantage that steering intervention is only triggered when the harm has occurred in the form of non-uniform charging.

However, the method according to DE 38 11 649 will not be able to compensate for non-uniform charging that may have occurred despite the controlling. The mechanical detection also means that the detection takes place immediately before the crop is picked up, so that an adequate control intervention may not be effected in time.

In the compression of bales it is important that the bales achieve the intended shape because bales often have to be stacked or be wrapped in plastic foil together.

The object of the present invention is to provide a method and a baler able, by means of automatic control, to ensure a uniform charging degree during compression so that the operator is relieved of stress.

According to the invention, this object is obtained by a method which is characterized in that the profile of the crop string in front of the pick-up device is determined by means of 3D imaging technology, that the profile is analyzed to determine a height distribution in the transverse direction of the crop string, that the baler is controlled so that the pick-up device is placed in the transverse direction relative to the height distribution, and that the position of the pick-up device is adjusted in dependence of the measured distribution of the charging degree. Through the use of 3D imaging technology and determination of a height distribution of the crop string profile, it is possible to obtain determination of the relevant profile and its sideways position on the field sufficiently far ahead of the baler for effectuation of a suitable control intervention. Suitable should be taken to mean both relative to the time and the magnitude of the control intervention. At the same time, any control inaccuracy that may nevertheless occur due, for example, to general steering inaccuracy or non-uniformity in the density of the crop string over the profile may be compensated for. This makes it possible to provide automatic steering of the tractor so that the user or the tractor operator is relieved of stress, which is not the case in the above prior art.

The baler may be of any type, such as the type bailing rectangular or box-shaped bales, or the type bailing round bales.

In an advantageous embodiment, the charging of the baler with crop is estimated by summing up the height distributions determined and their positions in the direction of width of the compression device as a result of the control, and the position of the pick-up device is adjusted in dependence of the estimated charging. This provides greater certainty of uniform charging. If the crop string is narrow relative to the baler, this method may result in an intended lurching driving whereby crop is, for example, alternately charged into one and the other side of the baler.

In an advantageous embodiment in which the baler is towed after a tractor, the position of the baler is controlled relative to the tractor transversely to the driving direction, and the tractor is steered so that it is positioned centrally relative to the crop string. Thereby, the tractor wheels do not drive on the crop string and squeeze it, while the desired control of the baler is obtained. Alternatively, and more simply, the tractor may be steered to position the baler relative to the crop string.

The baler may be automotive or towed by a tractor.

In a preferred embodiment in which a driving vehicle is an automotive baler or a towing tractor, the angle between a longitudinal direction of the crop string and the longitudinal direction of the driving vehicle is determined, and a stagger between the vertical centre plane of the crop string and the vertical centre plane of the driving vehicle is also determined, and the said angle and stagger are used for the steering and/or controlling. Determination of both the stagger and the angle provides greater predictability and thus greater precision of the control.

In a further preferred embodiment, a number of 3D images of the field and the crop string in front of the baler are recorded successively and analyzed to determine the path of the crop string on the field. Preferably, each image is analyzed, and features found in the image are searched for in the preceding image to determine thereby the relative positions on the field of the two images. Alternatively or as a supplement, gyro, GPS and/or odometry and the like are used to measure the change in position and orientation of the vehicle and the camera between two images, for example images n and n+1, in order to determine the relative positions on the field of the two images. In this way, the control of the baler may take into account any curvature of the crop string path on the field. It will moreover make it possible to steer the baler into place even on terrain with a side inclination, where the tractor and the baler will be at an angle to the driving direction due to the effect of gravity.

The object of the invention is also obtained by a baler of the type mentioned in the introduction, which baler is characterized in that it comprises a 3D imaging device for recording a 3D image of the field and the crop string in front of the baler, and a control device comprising a data processor for controlling the baler in dependence of data from the 3D image and the charging degree. Such baler may be used to apply the method according to the invention. The baler may be automotive or it may be towed by a tractor. In the latter case, the 3D imaging device will preferably be placed on the tractor to record an image of the field in front of the tractor.

As mentioned in the description of the method according to the invention, the baler may be of any type.

The 3D imaging device is a device with an electro-optical sensor and image processing equipment and is able to provide a pixel divided image with depth data, that is, data on the distance from an observed point to the camera, for at least some pixels. The 3D imaging device may thus be a stereo camera with a signal processing processor, that is, one or two cameras which provide two staggered images, whereupon the signal processor provides the depth data on the basis of the differences in the images, for example by triangulation. Another possibility is that the 3D imaging device is based on the time-of-flight principle, whereby a light impulse is emitted and the arrival time of the reflection is measured in respective pixels in a camera to provide depth data.

Figure 1:
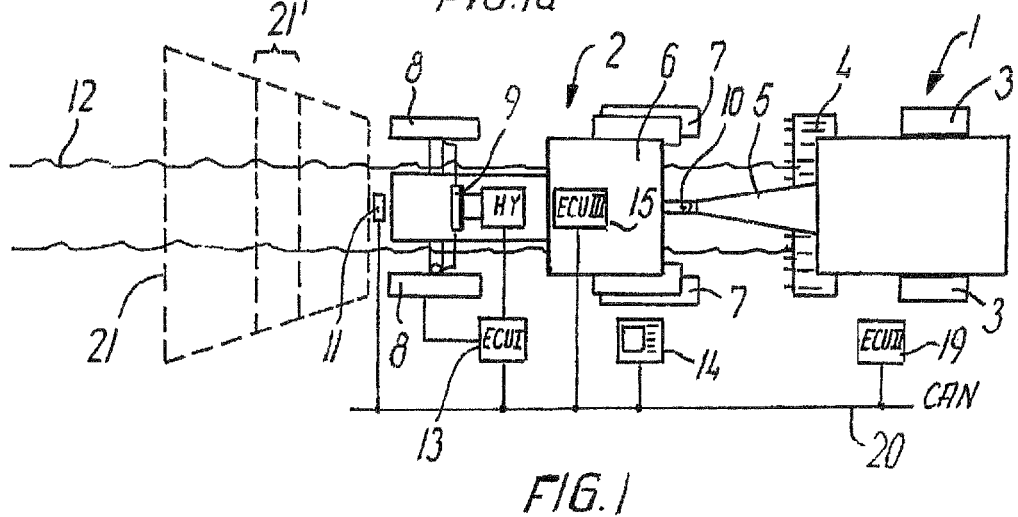
Figure 2A:
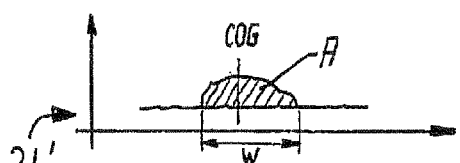
Figure 2:
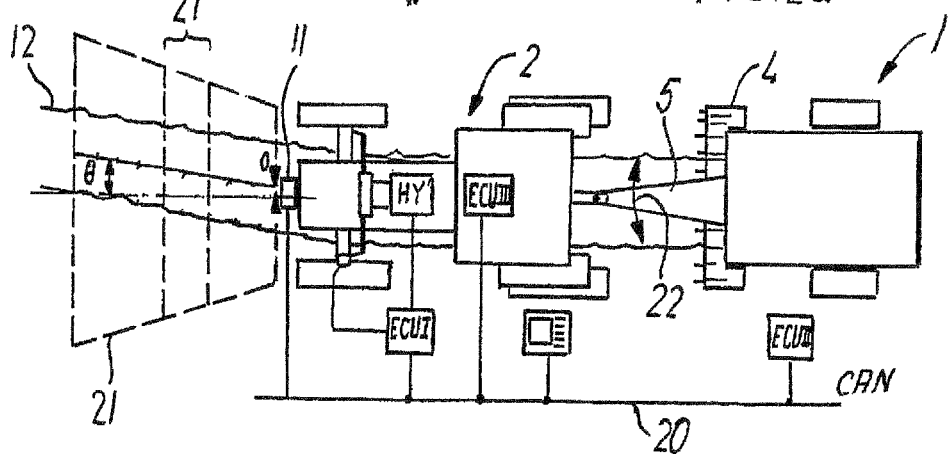

The invention will now be described in more detail below by means of an example of an embodiment and with reference to the schematic drawing, in which FIG. 1 is a plane view of a baler towed by a tractor during picking-up of a crop string, FIG. 1a shows the profile of the crop string, FIG. 2 is a plane view corresponding to that of FIG. 1, but showing picking up of a curved crop string, FIG. 2a shows the profile of the crop string, FIG. 3 illustrates measuring of the charging degree of a bale across the width, FIG. 4 shows examples of bale profiles, FIG. 5 illustrates a control system, and FIGS. 6 and 6a illustrates the coupling of several images to create a map.

FIGS. 1, 2 and 6 all show a baler 1 coupled to a towing tractor 2. The baler 1 has wheels 3, a pick-up 4, a tongue 5 and a compression chamber not shown in detail. The tractor 2 has an operator's cab 6, rear wheels 7, front wheels 8 turnable by means of a hydraulic cylinder 9 and a coupling device 10 for fastening of the tongue 5 of the baler. At the very front of the tractor, a 3D imaging device is mounted in the form of a stereo camera 11 incorporating a signal processor.

The stereo camera 11 records images of a crop string 12 of hay/straw/grass in front of the tractor. The tractor 2 is equipped with electro-hydraulic control with a processor 13, the hydraulic cylinder 9 and a terminal 14 with a monitor for communication with the user. The tractor has another processor 15 for controlling and monitoring various functions in the tractor, such as safety functions, and sensors for, for example, speed measurement and wheel position measurement.

The baler 1 is equipped with means for measuring a distribution of a charging degree across the compression direction in the form of an indicator (FIG. 3) which can measure whether the bale lacks material in one of the sides or possibly at several points across the bale. The indicator is thus shown with two arms 16, one end of which rests on the bale 17 (in this case a round bale), and whose rotation about a mounting point 18 at the other end is measured. A processor 19 monitors the magnitudes of the rotation of the arms 16 and particularly differences in such rotations which indicate a non-uniform charging degree. FIG. 4 shows three bales 17a, 17b, 17c, which are uneven to one side, even and uneven to the other side, respectively, the uneven bales lacking material in the left and the right side, respectively, as a result of uneven charging across their width, that is, transversely to the compression direction.

All sensors, processors or ECU's (electronic control units) 3, 15, 19 and camera 11 are directly or indirectly connected via a CAN network 20 for communication between such units.

The mode of action of the apparatus so described will now be described with reference to FIG. 2.

The stereo camera 11 records an image 21 of the crop string 12 of hay/straw/grass from about 1 metre to 6 metres in front of the tractor 2 and analyzes the image 21. A result called the "position" consists in the position of the crop string relative to the tractor. This position consists in a stagger or an offset O and an angle θ to the middle of the crop string or the windrow 12. These data are primary data for steering the tractor 2 and the baler 1 straight above the windrow 12.

To be able to control the charging of the baler 1, the profile of the windrow 12 (FIG. 1a) is continuously analyzed with determination of cross-sectional area A, width W and centre of gravity COG so that the crop material may be evenly distributed across the width of the compression chamber. The result of the profile analysis, the "profile", is used to move the tractor and the baler sideways relative to the optimum steering line based on "position".

At the beginning of the compression of a bale, open loop control based on the results of the profile analysis, the "profile", is used. At some stage, the indicator (FIG. 3) of the baler 1 will probably, depending on conditions, start signalling that material is lacking in one of the sides of the bale 17. This information will be used together with "position" and "profile" to control in a closed loop and adjust for the lacking material in one of the sides. When the indicator of the baler 1 reports that the bale is even (as the bale 17b), controlling in an open loop will recommence on the basis of the data from "profile".

In a further embodiment, the tractor 2 is steered straight above the windrow 12 either manually or automatically on the basis of the image 21 from the camera 11 and the elector-hydraulic control. To charge the baler 1 optimally, the baler is displaced sideways relative to the tractor. This may be obtained, for example, if the tongue 5 of the baler 1 is controllably swingable from side to side as indicated by the double arrow 22, for example by means of a hydraulic cylinder, not shown, or if the coupling device 10 on the tractor 2 is controllably movable from side to side.

The image processing for determination of the "position" may consist in an analysis of a combination of data on height, colour and/or texture. The first step is to distinguish between material (such as hay, straw, grass, etc.) and background. The second step is fitting a line to the middle of the material and from there to extract the angle θ and offset O of the windrow 12 relative to the tractor 2.

In connection with the determination of the offset O and the angle θ, the end of the windrow 12 and various obstacles and irregularities which may give rise to warning the user or stopping the tractor are determined.

The image processing for determination of the "profile" may consist in a continuous analysis of the entire image or a section 21' of the image 21 (FIGS. 1a and 2a) across the windrow 12. The profile 23 in the section 21' is approximated by means of a number of columns 24 in a suitable resolution. In a corresponding suitable resolution in the width of the bale 17, the contributions from each profile analysis are summed up to an estimated charging 25, and it is determined where the crop material on its way into the baler and with the approximated profile 24 should be positioned to obtain a (continued) even distribution of the summed up contributions to the distribution of crop material, that is, a (continued) even estimated charging 25.

To calculate how the crop material enters the baler 1 if the windrow 12 is not quite straight, the results from image to image 21*a*, 21*b* . . . 21*g* may be joined together into a map in the length of the tractor 2 and the baler 1. An analysis of this map will make it possible to calculate where the windrow 12 is relative to the pick-up 4 of the baler 1, even when driving in curves.

To determine the position of the baler 1' relative to the tractor 2 on inclined terrain and under other difficult conditions, it may be necessary continuously to measure the angle between the respective longitudinal centre planes of the tractor 2 and the baler 1.

If the tractor 2 or the baler 1 is provided with GPS equipment, it is possible continuously to store the cross-sectional area of the windrow together with a GPS position so that a yield map for the field will be created.

The invention claimed is:

1. A method of controlling a baler that picks up a crop while the baler moves in a forward direction in a field, the crop being in the form of a crop string having a profile, the baler comprising a pick-up device that picks up the crop string and passes the crop string to a compression device that compresses the crop string in a compression direction to form at least one bale, the compression device having a width in a direction transverse to the forward direction and comprising means for measuring a distribution of a degree of charging the baler with the crop transversely to the compression direction, said method comprising:

forming a 3D image of the profile of the crop string ahead of the pick-up device in the forward direction;

analyzing the profile to determine height distributions of the crop string in the direction transverse to the forward direction;

controlling the baler so that the pick-up device is positioned in the transverse direction relative to the height distribution; and adjusting the position of the pick-up device in dependence on the measured distribution of the charging degree.

2. The method according to claim 1, further comprising: estimating the charging of the baler with crop by summing up the determined height distributions and the positions of the crop string in the direction of the width of the compression device as a result of said controlling, and adjusting the position of the pick-up device in dependence the estimated charging.

3. The method according to claim 1 in which the baler is towed behind a tractor, said method further comprising:

controlling the position of the baler relative to the tractor transversely to the forward direction; and steering the tractor so that the tractor is positioned centrally relative to the crop string.

4. The method according to claim 1, wherein the baler is towed by a tractor or is an automotive baler driven in the forward direction, the baler has a vertical center plane, the crop string has a vertical center plane, the vertical center planes extend in a longitudinal direction, and said method further comprises:

determining the angle between the longitudinal direction of the crop string and the forward direction;

determining a lateral offset between the vertical center plane of the crop string and the vertical center plane of the driving vehicle; and using the angle and the lateral offset for said controlling.

5. The method according to claim 1, wherein said forming at least one 3D image comprises recording a plurality of 3D images of the field and the crop string in front of the baler successively and analyzing the images to determine the path of the crop string on the field.

6. The method according to claim 5, wherein analyzing the images comprises analyzing each image and for features found in one image, searching for those features in a preceding image to determine the relative positions on the field of the two images.

7. A baler comprising:

a pick-up device for picking up a crop in the form of a crop string in a field;

a compression device disposed for compressing the crop in a compression direction to form at least one bale, said compression device comprising means for measuring a distribution of a charging degree transversely to the compression direction;

a 3D imaging device operative for recording at least one 3D image of the field and the crop string in front of the baler; and a control device coupled to said 3D imaging device and comprising a data processor for controlling the baler in dependence on data from the 3D image and the charging degree.

8. The baler according to claim 7, wherein:

said baler is coupled to a towing tractor at a coupling point and is movable in a forward direction ;

said 3D imaging device comprises an electro-optical sensor mounted on the tractor; and the coupling point is controllably movable in direction transverse to the forward direction relative to at least one of the tractor and the baler.

\* \* \* \* \*